US012719135B2

(12) United States Patent
Fu et al.

(10) Patent No.: US 12,719,135 B2
(45) Date of Patent: Aug. 25, 2026

(54) LITHIUM-ION CELL, BATTERY AND POWER DEVICE

(71) Applicant: ZHUHAI COSMX BATTERY CO., LTD., Zhuhai (CN)

(72) Inventors: Xiaohu Fu, Zhuhai (CN); Shiguang Li, Zhuhai (CN); Hu Zou, Zhuhai (CN)

(73) Assignee: ZHUHAI COSMX BATTERY CO., LTD., Zhuhai (CN)

( * ) Notice: Subject to any disclaimer, the term of this patent is extended or adjusted under 35 U.S.C. 154(b) by 795 days.

(21) Appl. No.: 18/176,290

(22) Filed: Feb. 28, 2023

(65) Prior Publication Data

US 2023/0207969 A1 Jun. 29, 2023

Related U.S. Application Data

(63) Continuation-in-part of application No. PCT/CN2021/112048, filed on Aug. 11, 2021.

(30) Foreign Application Priority Data

Aug. 31, 2020 (CN) ........................ 202021864512.X

(51) Int. Cl.
*H01M 50/477* (2021.01)
*H01M 10/0525* (2010.01)
(Continued)

(52) U.S. Cl.
CPC ..... *H01M 50/474* (2021.01); *H01M 10/0525* (2013.01); *H01M 50/119* (2021.01);
(Continued)

(58) Field of Classification Search
CPC ............. H01M 50/471; H01M 50/474; H01M 50/477; H01M 50/48; H01M 50/483;
(Continued)

(56) References Cited

U.S. PATENT DOCUMENTS 10,505,231 B2 12/2019 Fujii
2003/0165736 A1 * 9/2003 Hiratsuka ........... H01M 50/124 429/176
(Continued)

FOREIGN PATENT DOCUMENTS

CN 105283999 A 1/2016
CN 105474454 A 4/2016
(Continued)

OTHER PUBLICATIONS

Merriam Webster's Definition of paper (taken from internet on Dec. 18, 2025) (Year: 2025).*
(Continued)

*Primary Examiner* — Jeremiah R Smith

(57) ABSTRACT

The application discloses a lithium-ion cell, a battery and a power device, which belongs to the technical field of lithium-ion battery structure. A side surface of an end portion of a cell body of the lithium-ion cell has a thin area relative to a middle portion of the cell body, and the lithium-ion cell further includes adhesive paper attached to the thin area. In this application, a special adhesive paper is designed and attached to the thin area formed due to thinning processing at the edge of the end portion of the lithium-ion cell body, and is suitable for compensating for the thin area of the lithium-ion cell, so that the cell has a flat surface, is stressed uniformly during hot-pressing formation and has a good bonding.

16 Claims, 4 Drawing Sheets

(51) Int. Cl.

| | |
|---|---|
| ***H01M 50/119*** | (2021.01) |
| ***H01M 50/474*** | (2021.01) |
| ***H01M 50/483*** | (2021.01) |
| ***H01M 50/538*** | (2021.01) |

(52) U.S. Cl.
CPC ....... *H01M 50/477* (2021.01); *H01M 50/483* (2021.01); *H01M 50/538* (2021.01)

(58) Field of Classification Search
CPC .. H01M 50/486; H01M 50/538; H01M 50/54; H01M 10/052; H01M 10/0525
See application file for complete search history.

(56) References Cited

U.S. PATENT DOCUMENTS

| | | | | |
|---|---|---|---|---|
| 2009/0297936 | A1* | 12/2009 | Nemoto | H01M 50/227 429/152 |
| 2016/0141721 | A1* | 5/2016 | Mimura | H01M 4/139 429/162 |
| 2016/0181650 | A1* | 6/2016 | Ide | H01M 10/0525 429/211 |
| 2018/0366786 | A1* | 12/2018 | Fujii | H01M 4/13 |
| 2019/0267628 | A1* | 8/2019 | Yadav | H01M 4/366 |
| 2021/0091405 | A1* | 3/2021 | Wang | H01M 50/46 |
| 2021/0359370 | A1* | 11/2021 | Wang | H01M 50/293 |

FOREIGN PATENT DOCUMENTS

| | | | |
|---|---|---|---|
| CN | 205846076 | U | 12/2016 |
| CN | 106654348 | A | 5/2017 |
| CN | 109088091 | A | 12/2018 |
| CN | 210926138 | U | 7/2020 |
| CN | 202917577 | U | 5/2021 |
| CN | 213520076 | U | 6/2021 |

OTHER PUBLICATIONS

International Search Report and Written Opinion dated Nov. 11, 2021 for International Application No. PCT/CN2021/112048.

* cited by examiner

LITHIUM-ION CELL, BATTERY AND POWER DEVICE

This application is a continuation-in-part of International Application No. PCT/CN2021/112048, filed on Aug. 11, 2021, which claims the priority to the Chinese patent application No. 202021864512.X, entitled "Lithium-ion Cell" and filed with the China National Intellectual Property Administration (CNIPA) on Aug. 31, 2020, both of which are hereby incorporated by reference in their entireties.

TECHNICAL FIELD

This application relates to the technical field of lithium-ion battery structure, and in particular, to a lithium-ion cell, a battery and a power device.

BACKGROUND

Lithium-ion batteries have become the most-efficient energy storage device after their commercialization due to their high energy density and power density, and longer cycle life. Lithium-ion batteries have been widely used in portable electronic devices and are increasingly used in electric vehicles (EVs), hybrid electric vehicles (HEVs), and smart grids.

In recent years, with a popularization of 4G communication technology, a continuous maturity of 5G and a rapid development of new energy power vehicles, requirements for rate capability and endurance of lithium-ion batteries are getting higher and higher, which requires lithium-ion batteries to have a high-rate charge and discharge capability while having higher energy density. Cells with multi-tabs winding and lamination structure have a characteristic of low internal resistance and are suitable for high-power charging and discharging applications.

At present, the commonly used rate-type lithium-ion cells have a multi-tabs winding structure and lamination structure. The electrode sheets having these structures are mostly coated by zebra coating. There exists a thinning on edges of positive and negative electrode sheets near to uncoated foil with respect to the zebra coating, so that the edges of the electrode sheets are thinner than the middle position thereof; due to the overlapped thickness of the wound cell or the laminated cell, the end portion of the wound cell or the laminated cell is thinner than the middle portion of the body. During hot-pressing formation, due to the lower thickness, the end portion of the cell is hot-pressed under a smaller pressure, has a poor bonding at the end portion, and is prone to deformation.

SUMMARY

The purpose of this application is to provide a lithium-ion cell, which can compensate for the thin area occurred due to the thinning process on the side face of the end portion of the lithium-ion cell, so as to improve the yield during the hot-pressing formation of the lithium-ion cell. This application is realized by the following technical solutions.

According to a first aspect of this application, a lithium-ion cell is provided. The lithium-ion cell, in which a side face of an end portion of a cell body of the lithium-ion cell has a thin area relative to a middle portion of the cell body, is characterized in that, the lithium-ion cell further includes an adhesive paper attached to the thin area.

Specifically, when the adhesive paper is attached to the thin area, a height difference between an outer plane of a substrate layer of the adhesive paper and a side face of the middle portion of the cell body on a side where the adhesive paper is located is less than 0.5 mm.

Specifically, the thin area is at least one inclined plane formed by a decreasing thickness of the end portion of the cell body in a direction from the middle portion of the cell body to an end surface of the cell body; the adhesive paper is an adhesive paper whose thickness increases in the direction from the middle portion of the cell body to the end surface of the cell body.

Specifically, the adhesive paper includes a substrate layer and an adhesive layer, and the substrate layer has an outer plane and an inner inclined plane having an included angle $\alpha$ relative to the outer plane, and the adhesive layer is disposed on the inner inclined plane.

Specifically, one layer of the adhesive paper is attached to one thin area, and the one layer of the adhesive paper has an included angle $\alpha$ of 0-20 degrees.

Specifically, at least two layers of the adhesive papers are attached to one thin area, and each layer of the adhesive paper in the at least two layers of the adhesive paper has an included angle $\alpha$ of 1-7 degrees.

Specifically, the adhesive paper has a maximum thickness of 0.2-2 mm.

Specifically, the adhesive paper has a length of 2-15 mm.

Specifically, the lithium-ion cell has a rectangular section.

According to a second aspect of this application, a battery is provided. The battery includes the lithium-ion cell as described above, a shell that encapsulates the lithium-ion cell, and an electrolyte. The shell is a soft shell made of laminated aluminum film or a hard metal shell, where the hard metal shell is a hard aluminum shell or a hard steel shell. Specifically, the soft shell made of a laminated aluminum film and the hard metal shell are commercially available on the market.

According to a third aspect of this invention, a power device is provided, which includes the battery as described above.

The beneficial effect of this application is that at least one layer of adhesive paper with local thickness variation is used to compensate for the thickness defect at the end portion of the cell, and the adhesive paper is adaptively attached to the thin area at the top of the cell, so that the cell has a flat surface, is stressed uniformly during a hot-pressing formation, and has a good bonding; accordingly, the cell is formed without a swollen head after the hot-pressing formation, and further without the swollen head in a subsequent long cycle process. The battery including the lithium-ion cell has excellent safety, is easy to use and has improved electrochemical performance.

DESCRIPTION OF EMBODIMENTS

The specific embodiments of this application will be further described below with the reference to accompanying drawings; for the convenience of explanation, the definitions of orientations such as up, down, left, and right in this application are only for the convenience of clearly describing the structure of the device, and are not used for limitation on the actual orientation of the device in the process of production, use, and sales. Combinations between various examples or between features of various examples may be combined to form new examples without conflict. The specific embodiments of this application will be further described below with reference to the accompanying drawings.

Example 1

Figure 1:
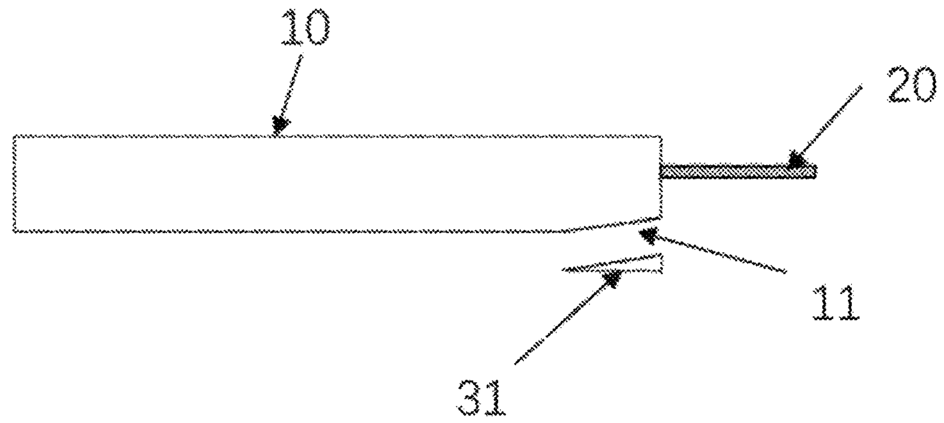
FIG. 1 is a schematic diagram of the matching of a cell body and an adhesive paper in Example 1 of this application.

Referring to FIG. 1, this example provides a lithium-ion cell, including a cell body 10 formed by winding or lamination process, and a tab 20 protruding from an end surface of an end portion of the cell body 10. In this example, the lithium-ion cell has a structure of multi-tab winding or laminating. Electrode sheets are coated by a zebra-coating. There exists thinning phenomenon at edges of zebra-coated positive and negative electrode sheets close to uncoated foils, so that the end portions of the electrode sheets are thinner than the middle positions thereof. Due to the overlapped thickness of the wound cell or the laminated cell, the end portion of the cell body 10 is thinner than the middle portion thereof, that is, a thin area 11 is formed due to the thinning process on the side surface of the end portion of the cell body 10. In FIG. 1, the cell body 10 is disposed transversely, and the thin area 11 formed is located at the right end of the cell body 10. The right end refers to a section located at the right end relative to a middle portion of the cell body 10, and the end surface of the end portion of the cell body 10 refers to an end surface at the rightmost side of the right end, which can be determined with reference to the protruding position of the tab 20 in FIG. 1. A side surface of the end portion of the cell body 10 refers to the upper and lower side surfaces of the right end (in FIG. 1, the upper and lower side surfaces, or the front and rear side surfaces, etc.), which can be determined in combination with the position of an adhesive paper 31 in FIG. 1. The thin area 11 is located on the end portion of the cell body 10 from which the tab 20 protrudes.

In order to compensate for the thin area 11, the cell body 10 is made to have a flat outer edge, which facilitates performing the subsequent hot-pressing formation on the cell. The shape and thickness of the adhesive paper 31 provided in this example are designed to be suitable for compensating for the thin area 11 of the lithium-ion cell. Specifically, as shown in FIG. 1, the thin area 11 is an inclined plane formed on one side of the end portion of the lithium-ion cell due to a decreasing thickness in a direction from the middle portion of the cell body to the end surface of the cell body; correspondingly, the adhesive paper 31 is a piece of adhesive paper with increasing thickness in the direction from the middle portion of the cell body to the end surface of the cell body (that is, from left to right in FIG. 1).

It can be understood that during processing of the positive and negative electrodes, it is not excluded to use other processing means similar to the thinning means, nor is it excluded that thin areas with other shapes are formed on the cell body 10. Correspondingly, the shape and thickness of the adhesive paper 31 can be designed and processed in advance according to the specific thin area. In this example, the preparation and attachment manners of the adhesive paper are as follows:

(1) measuring a thickness of respective edge of the rolled positive and negative electrode sheets, and recording the thickness change value of the electrode sheets from the edge to the main body thereof;

(2) calculating the thickness change of the cell from the end portion to the main body thereof by the fold number or number of the electrode sheets of the wound cell/laminated cell and the thickness change of the electrode sheets;

(3) designing the thickness change of the adhesive paper according to the thickness change of the cell from the end portion to the main body thereof; the thickness change trend of the adhesive paper is opposite to that of the end portion of the cell; after the adhesive layer is attached to the cell, the thickness and shape are compensated, such that the entire surface of the cell becomes flat; the substrate material of the adhesive paper may be PI (Polyimide), PET (Poly(Ethylene Terephthalare)), BOPP (Biaxial Oriented Polypropylene), PE (Polyethylene), etc., and the material of the adhesive layer may be acrylic glue, silica gel, rubber, etc.;

(4) when the cell with a flat thickness is formed by hot pressing, the cell has a uniform surface pressure, and has a uniform internal bonding.

Example 2

Figure 2:
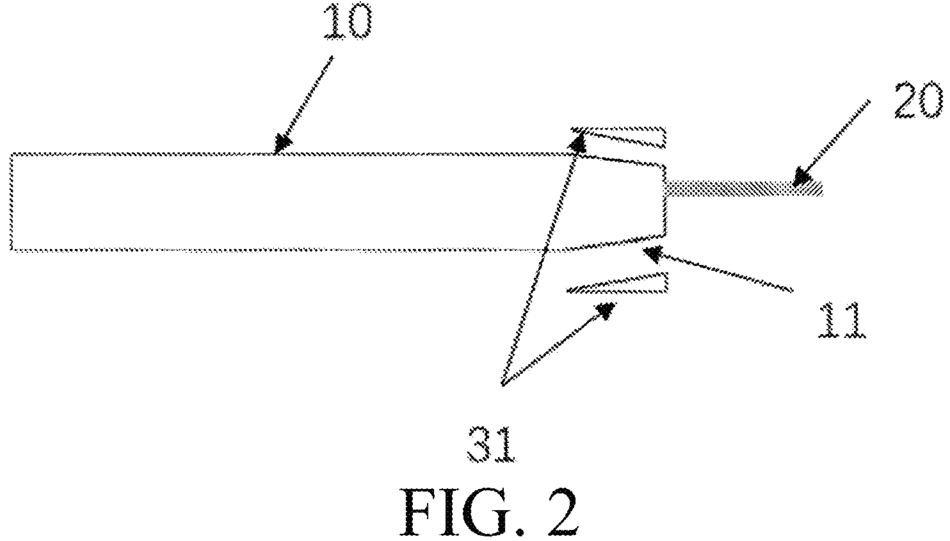
FIG. 2 is a schematic diagram of the matching of a cell body and an adhesive paper in Example 2 of this application.

As shown in FIG. 2, the difference between Example 2 and Example 1 is that the thin area 11 is two inclined surfaces which are respectively formed on two opposite sides of the end portion of the lithium-ion cell by a decreasing thickness in a direction from the middle portion of the cell body to the end surface of the cell body. Correspondingly, there are two pieces of the adhesive paper 31, which are respectively attached to the two inclined surfaces (i.e., two thin areas), and the two pieces of the adhesive paper are adhesive papers with increasing thickness from one end to the other end thereof.

Example 3

Figure 3:
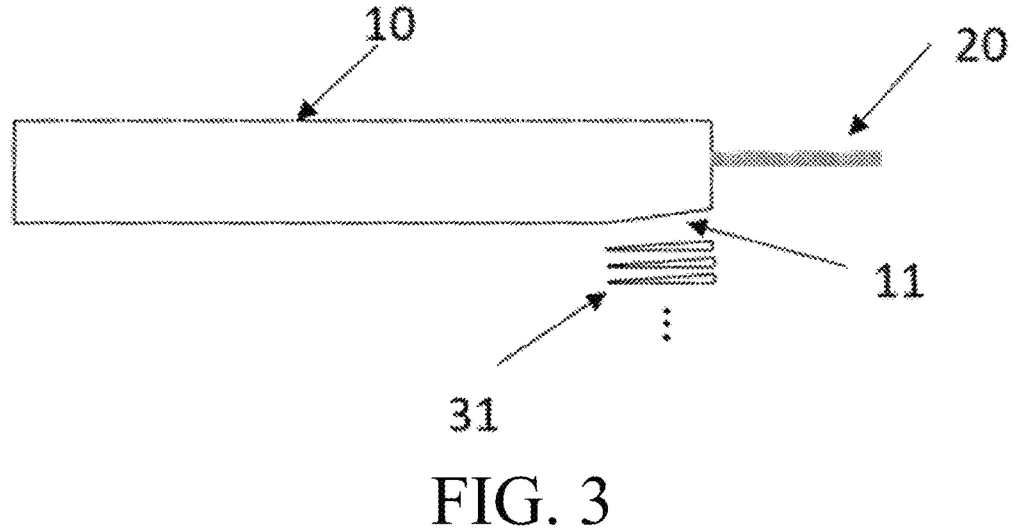
FIG. 3 is a schematic diagram of the matching of a cell body and an adhesive paper in Example 3 of this application.

As shown in FIG. 3, the difference between Example 3 and Example 1 is that the thin area 11 is an inclined surface having a larger inclination angle and formed on a side of the end portion of the lithium-ion cell by a decreasing thickness in a direction from the middle portion of the cell body to the end surface of the cell body. The adhesive paper 31 attached is multi-layered, and the multi-layered adhesive paper are attached to the inclined surface (i.e., two thin areas) on top of one another, and each piece of the adhesive paper is an adhesive paper with increasing thickness from one end to the other end.

Example 4

Figure 4:
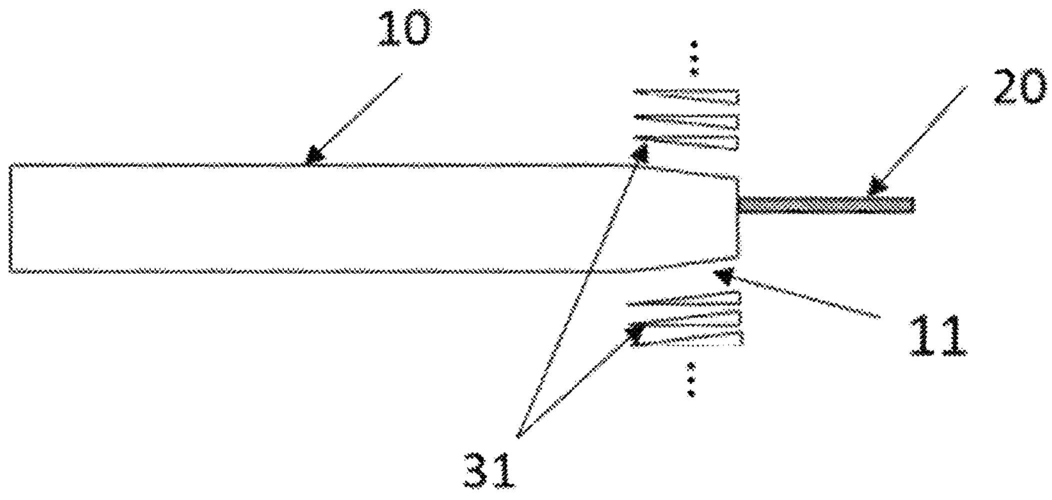
FIG. 4 is a schematic diagram of the matching of a cell body and an adhesive paper in Example 4 of this application.

As shown in FIG. 4, the difference between Example 4 and Example 2 is that the thin area 11 is two inclined surfaces each having a larger inclination angle and respectively formed on the two opposite sides of the end portion of the lithium-ion cell by a decreasing thickness from the middle portion of the cell body to the end surface of the cell body. Correspondingly, the adhesive paper are divided into two groups, each group being multi-layered, and the two groups are respectively attached to the two inclined surfaces (i.e., two thin areas), each piece of the adhesive paper being the adhesive paper with increasing thickness from one end to the other end.

The specific structure of each adhesive paper used in the above examples and its optional parameters in different application scenarios are described as follows.

Figure 5:
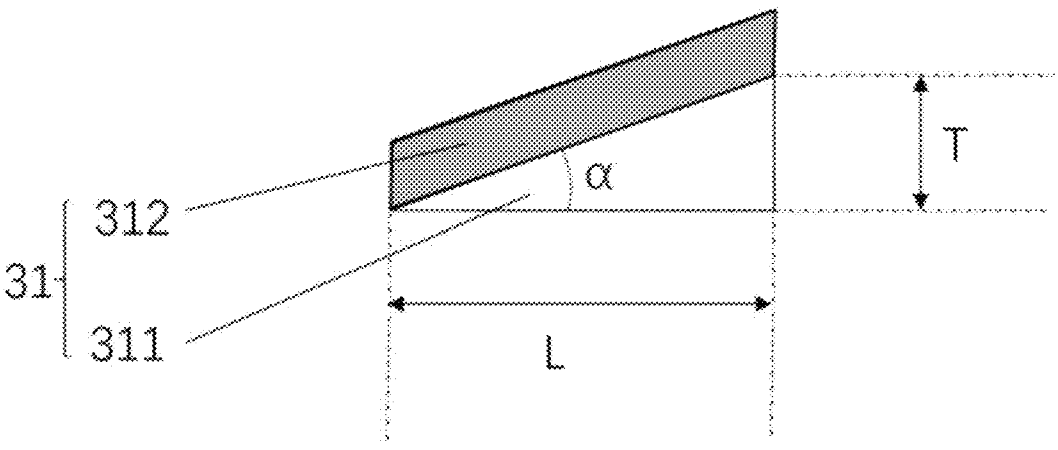
FIG. 5 is a structural schematic diagram of an adhesive paper in each example of this application.
Figure 6:
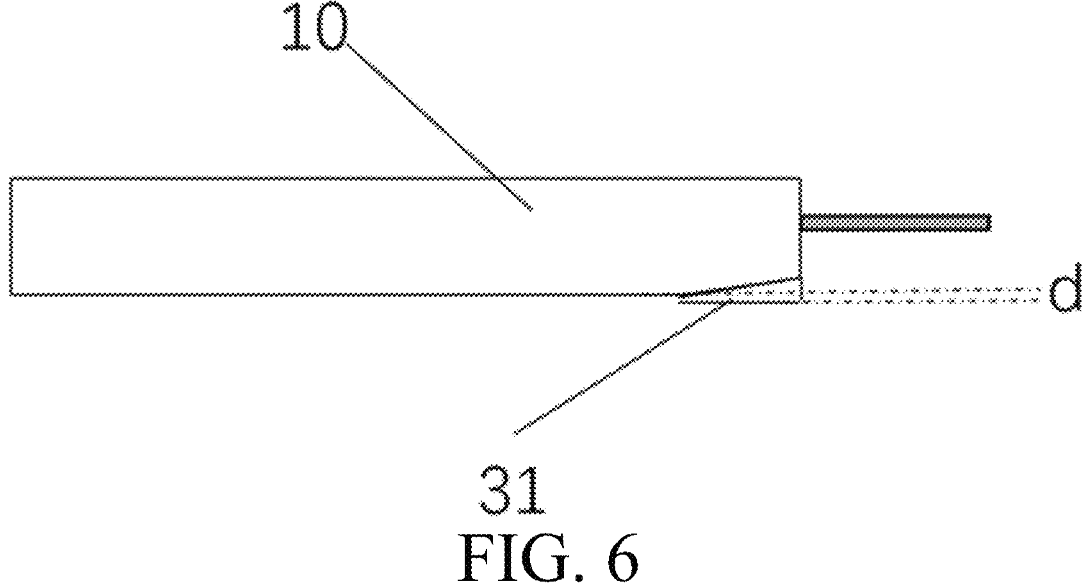
FIG. 6 is a schematic diagram illustrating the height difference between an outer plane of a substrate layer of an adhesive paper and a middle portion of a cell body after the adhesive paper is matched with the cell body in each example of this application.

Referring to FIG. 5, the adhesive paper 31 includes a substrate layer 311 and an adhesive layer 312. The substrate layer 311 has an outer plane and an inner inclined plane having an included angle α relative to the outer plane, and the adhesive layer 312 is provided on the inner inclined plane. Referring to FIG. 6, when the adhesive paper 31 is attached to the thin area 11 of the cell body 10, the height difference d between the outer plane of the substrate layer 311 of the adhesive paper 31 and a side surface of the middle portion of the cell body on a side where the adhesive paper is located is less than 0.5 mm.

Referring to FIG. 5 again, in the application scenario of Example 1 or Example 2, that is, when only one layer of the adhesive paper 31 is attached to one thin area 11, the included angle α of the one layer of the adhesive paper 31 is selected in the range of 0-20 degrees. In the application scenario of Example 3 or Example 4, that is, when at least two layers of the adhesive paper 31 are attached to one thin area 11, the included angle α of each layer of the adhesive paper 31 in the at least two layers of the adhesive paper is selected in the range of 1-7 degrees. That is, when there are multiple layers of the adhesive paper, the thickness of each layer of the adhesive paper increases in a relatively gentle manner from one end to the other end in a length direction of each layer. In addition, in any application scenarios, the thickness T of the thickest part of the adhesive paper 31 is selected between 0.2 mm and 2 mm, and the length L of the adhesive paper 31 is 2-15 mm.

Example 5

Figure 7:
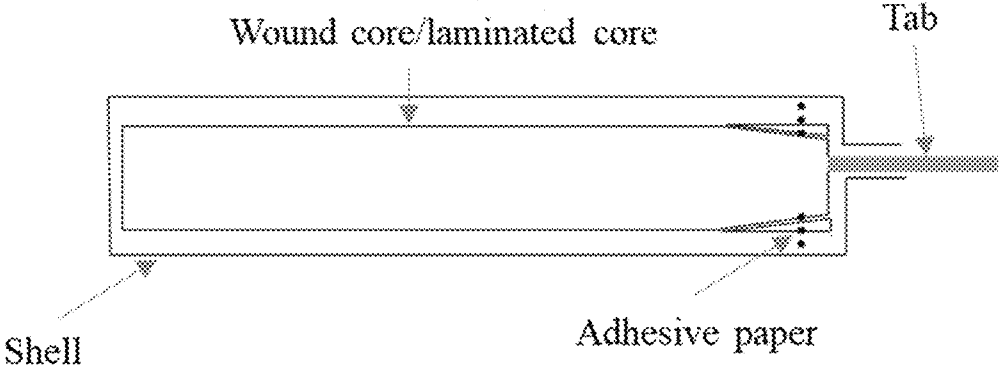
FIG. 7 is a structural schematic diagram of a soft shell made of a laminated aluminum film or a hard metal shell sealed outside a wound cell/laminated cell of this application.

Referring to FIG. 7, this example provides a battery, which includes a shell, a cell and an electrolyte. The cell may be the lithium-ion cell including adhesive paper, which is prepared according to any of the above examples. The cell in the form of wound core/laminated core may be sealed by an external soft shell made of a laminated aluminum film or hard metal shell and fixed in the shell, and one or more layers of adhesive paper may be attached to both sides of the ends of the cell body respectively. In a specific implementation, the electrolyte is filled into a space between the inner wall of the shell and the lithium ion cell.

When the cell is sealed using the laminated aluminum film or steel material, any existing technical methods known in the art may be used, and then the qualified battery can be obtained after quality tests.

The above examples are only to fully disclose rather than limit this application. Any replacement of equivalent technical features that can be obtained without creative work based on the creating spirit of this application should be regarded as the scope of the disclosure of this application.

What is claimed is:

1. A lithium-ion cell, a side face of an end portion of a cell body of the lithium-ion cell having a thin area relative to a middle portion of the cell body, wherein the lithium-ion cell further comprises an adhesive paper attached to the thin area;

wherein the thin area is at least one inclined plane formed by a decreasing thickness of the end portion of the cell body in a direction from the middle portion of the cell body to an end surface of the cell body; the adhesive paper is an adhesive paper whose thickness increases in the direction from the middle portion of the cell body to the end surface of the cell body;

wherein the adhesive paper comprises a substrate layer and an adhesive layer, and the substrate layer has an outer plane and an inner inclined plane having an included angle α relative to the outer plane, and the adhesive layer is disposed on the inner inclined plane.

2. The lithium-ion cell according to claim 1, wherein when the adhesive paper is attached to the thin area, a height difference between the outer plane of the substrate layer of the adhesive paper and a side face of the middle portion of the cell body on a side where the adhesive paper is located is less than 0.5 mm.

3. The lithium-ion cell according to claim 2, wherein the adhesive paper has a maximum thickness of 0.2-2 mm.

4. The lithium-ion cell according to claim 1, wherein one layer of the adhesive paper is attached to one thin area, and the one layer of the adhesive paper has an included angle α of 0-20 degrees.

5. The lithium-ion cell according to claim 4, wherein the adhesive paper has a maximum thickness of 0.2-2 mm.

6. The lithium-ion cell according to claim 1, wherein at least two layers of the adhesive paper are attached to one thin area, and each layer of the adhesive paper in the at least two layers of the adhesive paper has an included angle α of 1-7 degrees.

7. The lithium-ion cell according to claim 1, wherein the adhesive paper has a maximum thickness of 0.2-2 mm.

8. The lithium-ion cell according to claim 1, wherein the adhesive paper has a length of 2-15 mm.

9. The lithium-ion cell according to claim 1, wherein the lithium-ion cell comprises the cell body formed by winding or laminating mode, and a tab extending out from the end surface of the cell body.

10. The lithium-ion cell according to claim 9, wherein the thin area is located at one end portion of the cell body from which the tab protrudes.

11. The lithium-ion cell according to claim 1, wherein the thin area comprises two inclined planes formed on opposite two sides of the end portion of the lithium-ion cell by a decreasing thickness in the direction from the middle portion of the cell body to the end surface of the cell body.

12. A battery, comprising a cell, a shell that encapsulates the cell and an electrolyte, wherein the cell is the lithium-ion cell according to claim 1.

13. The battery according to claim 12, wherein the shell is a soft shell made of laminated aluminum film.

14. The battery according to claim 12, wherein the shell is a hard metal shell.

15. The battery according to claim 14, wherein the hard metal shell is a hard aluminum shell or a hard steel shell.

16. A power device, wherein the power device comprises the battery according to claim 12.

* * * * *